C. T. HANNA.

Wheat Steamer and Drier.

No. 9,711. Reissued May 17, 1881.

WITNESSES:

W. W. Hollingsworth

Amos W. Hart

INVENTOR:

Cyrus T. Hanna

BY

ATTORNEYS.

UNITED STATES PATENT OFFICE.

CYRUS T. HANNA, OF PITTSBURG, PENNSYLVANIA.

WHEAT STEAMER AND DRIER.

SPECIFICATION forming part of Reissued Letters Patent No. 9,711, dated May 17, 1881.

Original No. 107,680, dated September 27, 1870; Reissue No. 9,367, dated August 31, 1880. Application for reissue filed April 8, 1881.

*To all whom it may concern:*

Be it known that I, CYRUS T. HANNA, of Pittsburg, Allegheny county, Pennsylvania, formerly of Keokuk, Iowa, have invented a new and useful Improvement in the Process of and Apparatus for Preparing Grain for Grinding, which is substantially as set forth hereinafter, referring to the accompanying drawings, in which—

Figure 1:
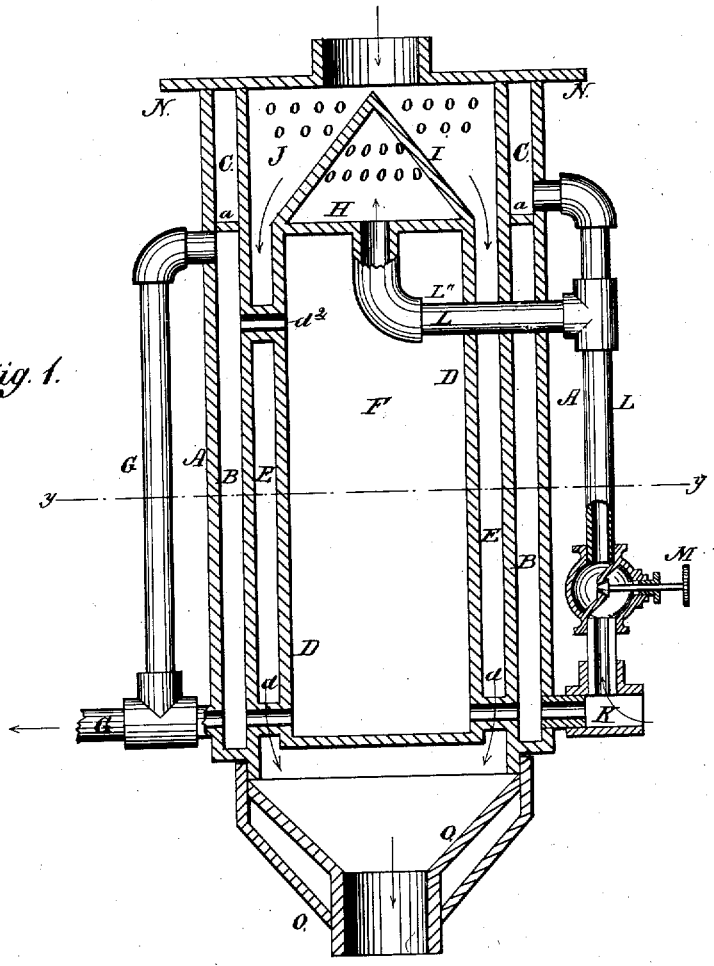
Figure 2:
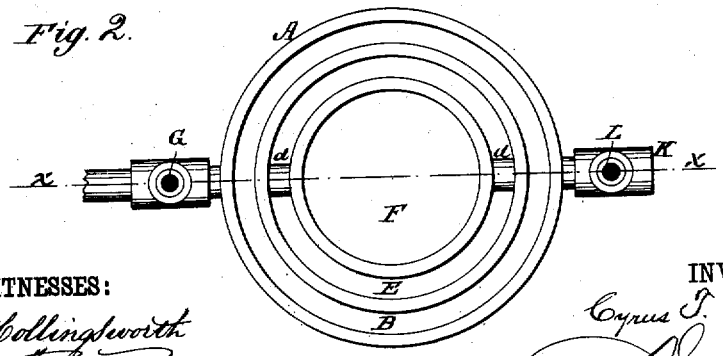

Figure 1 is a vertical section of the apparatus on line *x x*, Fig. 2. Fig. 2 is a horizontal section of the same on line *y y*, Fig. 1.

My invention relates to a process and apparatus for steaming and heating grain and feeding it to the grinding-stones hot, so that it may be ground while hot, to the end that a better article of flour may be produced.

The grain is passed, in a continuous stream, from a bin or chamber through a tubular channel to the burrs for grinding, or in some like way. In this passage it is conveyed into contact with heating-walls in a stream or sheet so thin as to be heated and dried throughout its mass nearly uniformly. It is carried down by its weight, so as to be evenly acted on by the heat. Before it passes onto the heated walls steam is passed through the grain to moisten as well as warm it. The quantity of steam, as well as of heat, is regulated in each case according to the kind and condition of grain, so as to dry that already too moist, to moisten that too dry, to dry the skin so as to separate readily, and to put the grain in best condition for grinding. This is done in each case with such degree of judgment as experience can best show, giving more or less of steam and less or more of heat to the walls for this or other desired result.

By applying heat to grain preparatory to grinding it is brought into the condition calculated to secure the best results in the manufacture of flour—that is to say, when ground in a heated condition the flour is whiter and stronger than that obtained by the ordinary process. This result is mainly due to the fact that the heat causes expansion and thus effects a partial separation between the starch and gluten, so that the grinding may be higher, the offal cleaned better, and the flour bolted or dressed much clearer.

The apparatus shown is hung upright, so as to form part of the grain-passage. It has an interior part, F, cylindrical in form. This has a conical top, H, which divides the grain evenly and passes it uniformly down the annular space E, around it on all sides. The walls B around this space E are inclosed by outer walls, inclosing a space between, closed at the end to form a jacket. The interior part, F, is hollow also, and has a cross-wall near the top, separating into two parts. The outer chamber is also divided by cross-walls *a* into two compartments. Steam is admitted by pipes K L into chambers B F, and heats them, and passes off by pipe G. This heats the grain in the thin sheet passing between and dries it. Steam passes by pipe L, having regulating-valve M and two branches, into chambers H C. These chambers have their grain-walls I J perforated with fine holes, which allow the steam to pass through into the grain to any degree desired, to moisten it. The grain, being hot when it leaves the funnel O, it is fed hot to the grinding-stones, which enables a superior article of flour to be produced, as before stated.

Having thus described my invention, what I claim as new is—

1. The improved milling process, or process of preparing grain for grinding and feeding it to a grinding-mill, which consists in passing it, by its own gravity, over or in contact with a heated surface, thus drying and heating it to the required degree, and then feeding it to the burrs or rolls while still hot, substantially as and for the purpose hereinbefore set forth.

2. The process of treating and feeding grain for grinding, which consists in moistening it by means of steam and immediately subjecting it to the action of dry heat to expel the surplus moisture, and then at once feeding it, while still hot, to the grinding-stones, as hereinbefore set forth.

3. In an apparatus for preparing grain for grinding, the combination of a steam-chamber and steam-conducting pipe provided with a valve, and a separate chamber, located below the former, for receiving steam or other heating medium, and a conducting-pipe connected therewith and provided with a valve, as shown and described, whereby the amount of steam discharged and degree of heat radiated are made separately regulable, for the purpose set forth.

4. The body of the steamer and heater, provided at its respective upper and lower ends with the steam-discharging cone and the funnel O, whose sides have the same, or nearly the same, superficial area, and are inclined at the same, or nearly the same, angle to a vertical plane, as shown and described, whereby the grain is caused to disperse or spread out in a thin sheet while being steamed, and then to converge or collect, as specified.

5. The combination of two steam-chambers, B F, with an intermediate chamber, E, through which the grain flows, as and for the purpose described.

6. The combination of a series of pipes, K L G $d'$ $d^2$ $d^3$, with the steam-chambers B F H C, for the purpose of introducing, circulating, and removing the steam and carrying off the condensed steam, substantially as herein shown and described.

7. The combination, with a grain-steaming apparatus, of the funnel-shaped double-walled chamber O placed thereunder, as and for the purpose specified.

8. The combination of the steam-chambers H and C, having perforated walls, and the steam-chambers F and B, having imperforate walls, to form the steaming-chamber J and drying-chamber E, substantially as shown and described, for the purpose specified.

9. An apparatus for use, as specified, which, when suspended vertically, is adapted to receive grain and allow passage and discharge of the same by its own gravity, and is provided with a chamber or chambers for receiving steam for the purpose of heating the grain as it passes in contact with the heated walls, as set forth.

CYRUS T. HANNA.

Witnesses:
JOS. A. KELLY,
JNO. W. HERRON.